| United States Patent [19] | [11] | 4,388,220 |
|---|---|---|
| Hartshorn et al. | [45] | Jun. 14, 1983 |

[54] TRANSITION METAL COMPOSITION, PRODUCTION AND USE

[75] Inventors: Angus J. Hartshorn, Runcorn; Eric Jones, Tarporley; John A. Segal, Welwyn Garden City, all of England

[73] Assignee: Imperial Chemical Industries Limited, London, England

[21] Appl. No.: 282,954

[22] Filed: Jul. 13, 1981

[30] Foreign Application Priority Data

Jul. 14, 1980 [GB] United Kingdom ................ 8022948
May 15, 1981 [GB] United Kingdom ................ 8114987

[51] Int. Cl.$^3$ ............................................... C08F 4/64
[52] U.S. Cl. ................................. 252/429 B; 426/125
[58] Field of Search ................................... 252/429 B

[56] References Cited

U.S. PATENT DOCUMENTS

| 3,821,186 | 6/1974 | Grant ........................... 252/429 B |
| 3,878,124 | 4/1975 | Durand et al. ................. 252/429 B |
| 4,159,965 | 7/1979 | Sakurai et al. ................. 252/429 B |
| 4,237,254 | 12/1980 | Kitagawa et al. .............. 252/429 B |
| 4,244,838 | 1/1981 | Gessell ......................... 252/429 B |
| 4,250,288 | 2/1981 | Lowery et al. ................. 252/429 B |
| 4,255,280 | 3/1981 | Sakurai et al. ................. 252/429 B |
| 4,263,168 | 4/1981 | Rochefort ..................... 252/429 B |
| 4,301,029 | 11/1981 | Caunt et al. .................. 252/429 B |

FOREIGN PATENT DOCUMENTS

| 2758312 | 7/1978 | Fed. Rep. of Germany ... 252/429 B |
| 2043607 | 2/1971 | France . |
| 1235062 | 6/1971 | United Kingdom ........... 252/429 B |
| 1306044 | 2/1973 | United Kingdom ........... 252/429 B |
| 1434264 | 5/1976 | United Kingdom . |
| 1484254 | 9/1977 | United Kingdom . |
| 1593492 | 7/1981 | United Kingdom ........... 252/429 B |

OTHER PUBLICATIONS

Encyclopedia of Chemical Technology edited by Kirk and Othmer.

*Primary Examiner*—Arthur P. Demers
*Attorney, Agent, or Firm*—Cushman, Darby & Cushman

[57] ABSTRACT

A transition metal composition is obtained by treating at least one particulate support material with at least one organomagnesium compound, at least one cleavage agent and at least one transition metal compound of Groups IVA, VA or VIA of the Periodic Table. The support material is typically a metal oxide, such as alumina or silica. The orgaomagnesium compound is typically a dialkyl magnesium compound such as dibutyl magnesium. The cleavage agent may be an amine, a thioalcohol, an ester, a carboxylic acid or particularly an alcohol such as n-butanol. The transition metal compound is added after the organomagnesium compound and the cleavage agent and is typically titanium tetrachloride. The product may be used as a catalyst component to polymerise an olefine monomer such as ethylene.

10 Claims, No Drawings

TRANSITION METAL COMPOSITION, PRODUCTION AND USE

The present invention relates to transition metal compositions, the production of such compositions and the use of the compositions as a component of a polymerisation catalyst to polymerise unsaturated monomers such as ethylene.

We have found that where, in the preparation of transition metal compositions which are used as components of the so-called Ziegler-Natta catalyst systems by treating a particulate support material with an organomagnesium compound and a compound of a transition metal of Groups IVA to VIA of the Periodic Table, the particulate support material is treated with a cleavage agent (as hereinafter defined) prior to treatment with the aforesaid compound of a transition metal, the transition metal composition obtained, when activated with a suitable activator (e.g. a non-transition metal of Groups IA to IIIA of the Periodic Table, typically triethyl aluminium), forms a catalyst having useful properties for the polymerisation of monomers such as ethylene.

Accordingly, one aspect of the present invention provides a transition metal composition which is the product of treating at least one particulate support material, with (a) at least one organomagnesium compound of formula $R^1MgR^2$ in which $R^1$ and $R^2$, which may be the same or different, are hydrocarbyl groups, (b) at least one agent which is (a) capable of reacting with the product obtained by treating the at least one particulate support material with the at least one organomagnesium compound to cleave at least a proportion of the carbon-magnesium bonds in the said product, and (b) does not form a magnesium-halide during the cleavage reaction (hereinafter referred to for convenience as "cleavage agent") and (c) at least one transition metal compound of Groups IVA, VA or VIA of the Periodic Table, with the proviso (i) that the at least one particulate support material is treated with (a) the at least one organomagnesium compound $R^1MgR^2$ and then with the at least one cleavage agent or (b) the at least one cleavage agent and then with the at least one organomagnesium compound $R^1MgR^2$ or (c) a mixture, or at least a notional product of a reaction, of the at least one organomagnesium compound $R^1MgR^2$ and the at least one cleavage agent prior to being treated with the at least one transition metal compound of Groups IVA, VA or VIA of the Periodic Table, and (ii) that the at least one cleavage agent does not consist of both a halogenating agent and a Lewis Base.

In a first preferred embodiment of the present invention the at least one particulate support material is treated with the at least one organomagnesium compound $R^1MgR^2$, then with the at least one cleavage agent, and then with the at least one transition metal compound of Groups IVA, VA or VIA of the Periodic Table.

In a second preferred embodiment of the present invention the at least one particulate support material is treated with (i) an organomagnesium compound which contains both (a) hydrocarbyl and (b) either hydrocarbyoxy, dihydrocarbylamino or hydrocarbylcarboxylate groups, which compound is at least notionally the product of reacting the at least one organomagnesium compound $R^1MgR^2$ with the at least one cleavage agent, and then (ii) the at least one transition metal compound of Groups IVA, VA or VIA of the Periodic Table. The at least one organomagnesium compound which is used in the second preferred embodiment of the present invention is conveniently a compound or mixture of compounds which is represented by the formula $R_x^1MgY_{2-x}$ in which Y is $-OR^3$, $-NR_2^3$ or $-OCOR^3$ where $R^3$ is a hydrocarbyl group and x has a value from 0.2 up to 1.8, preferably from 0.5 up to 1.5. $R^1$ and $R^3$ may be the same or different.

All references to the Periodic Table are to the version of the Periodic Table of the Elements printed inside the back cover of "Advanced Inorganic Chemistry" by F. A. Cotton and G. Wilkinson 3rd Edition, Interscience Publishers, 1976.

While we do not exclude the possibility that the at least one particulate support material is organic, e.g. a polymeric material such as polyethylene, preferably it is an inorganic material and particularly preferably it is substantially inert and has a reactive surface. By "reactive surface" we mean a plurality of sites on the surface of the at least one particulate support material which are capable of abstracting a metal hydrocarbyl from a solution thereof (hereinafter referred to for convenience as "reactive sites") which reactive sites are preferably hydroxyl groups chemically bonded to the surface of the at least one support material, and capable of reacting chemically with the metal hydrocarbyl compound, e.g. magnesium or lithium butyl.

The number of reactive sites on the at least one particulate support material can be determined by adding, to a known weight of the at least one particulate support material, a solution containing an excess quantity of a magnesium hydrocarbyl compound, stirring the mixture at ambient temperature for an hour and analysing the supernatant liquid to determine the quantity of the magnesium hydrocarbyl compound which remains in the solution, from which can be calculated the number of moles of magnesium hydrocarbyl compound which have been abstracted from the solution for each gram of the at least one particulate support material, this being equivalent to the proportion in moles of the reactive sites.

The at least one particulate support material will be substantially inert in that, whereas the said —OH groups are capable of reacting with the organomagnesium compound the bulk of the at least one particulate support material is chemically inert. The at least one particulate support material may be silica, alumina, magnesia, or mixtures of two or more thereof, for example magnesium trisilicate, which may be represented as $(MgO)_2(SiO_2)_3mH_2O$ (m is a positive number), or materials based thereon and containing minor amounts, for example less than 10% by weight, of other suitable particulate support materials such as zinc oxide. Particularly good examples of such particulate support materials are silica and alumina or mixtures thereof. These comprise a matrix of silicon or aluminium and oxygen atoms, to the surface of which —OH groups are attached, the hydrogen atoms of said groups having an acidic function. However, apart from the presence of these —OH groups, silica and alumina are generally regarded as chemically inert. Within the terms silica and alumina we include silica and alumina based materials containing small amounts, for example less than 10% by weight, of other suitable inorganic oxides, such as magnesium oxide and zinc oxide. The preferred at least one particulate support materials are silica and/or alumina.

The at least one particulate support material is subjected to a drying procedure, for example a simple heat treatment. The said heat treatment is suitably carried out at a temperature in the range 100° C. to 1000° C., and preferably at a temperature in the range 150° to 800° C. The heat treatment is conveniently carried out by heating the at least one particulate support material in vacuo or under an inert atmosphere (e.g. nitrogen) at atmospheric pressure or by heating the at least one particulate support material in a high boiling point hydrocarbon, for example under azeotropic conditions. The time of drying is not critical but is conveniently in the range 1 to 24 hours.

The hydrocarbyl groups $R^1$ and $R^2$ in the at least one organomagnesium compound $R^1MgR^2$ may be alkyl groups, aryl groups, cycloalkyl groups, aralkyl groups, alkadienyl groups or alkenyl groups. The number of carbon atoms in the hydrocarbyl group $R^1$ or $R^2$ is generally between 1 and 30, but this number is not critical. Preferably, the at least one organomagnesium compound $R^1MgR^2$ is soluble in liquid hydrocarbons, for example, toluene, hexane. Examples of magnesium compounds particularly suitable for use in the first preferred embodiment of the present invention are diethyl magnesium, dipropyl magnesium, di-isopropyl magnesium, dibutyl magnesium, disobutyl magnesium, butyl octyl magnesium, diamyl magnesium, dihexyl magnesium, diallyl magnesium, didecyl magnesium and didodecyl magnesium, dicycloalkyl magnesium with identical or different cyclo-alkyl groups containing 3 to 12 carbon atoms, preferably 5 or 6 carbon atoms. The magnesium may further carry an alkyl and a cycloalkyl group. Diphenyl magnesium is the preferred aromatic compound although, e.g. ditolyl or dixylyl magnesium, and magnesium aryls derived from compounds with two or more condensed or non-condensed aromatic nuclei can also be used.

In the first preferred embodiment of the present invention, preferably a dialkyl magnesium is used wherein the alkyl groups are $C_1$-$C_{10}$ groups, particularly preferably dibutyl magnesium, which may be present as a mixture of dibutyl magnesiums, for example a mixture of di-n-butyl magnesium and di-isobutyl magnesium.

When the at least one organomagnesium compound $R^1MgR^2$ is reacted with the at least one particulate support material which is inorganic and contains hydroxyl groups, at least one hydrocarbyl group may be displaced by reaction with the —OH groups of the at least one particulate support material, with liberation of the corresponding free hydrocarbon.

The hydrocarbyl group $R^1$ in the at least one organomagnesium compound $R_x^1MgY_{2-x}$ has the meaning hereinbefore ascribed to it. The hydrocarbyl group $R^3$ in the at least one organomagnesium compound $R_x^1MgY_{2-x}$ which may be the same as $R^1$, may be an alkyl, aryl or cycloalkyl group, preferably it is an alkyl group having from 2 to 10 carbon atoms or an aryl group, which may optionally be substituted, for example a 2,6-ditertiarybutyl-4-methylphenyl group.

The at least one organomagnesium compound $R_x^1MgY_{2-x}$ may be prepared by any of the procedures known for preparing this type of compound. The convenient method of preparation is to add to a solution of the at last one organomagnesium compound $R^1MgR^2$ a solution of an appropriate alcohol, phenol, amine or carboxylic acid in a hydrocarbon medium. By reacting suitable proportions of the alcohol, phenol, amine or carboxylic acid with the at least one organomagnesium compound $R^1MgR^2$ the value of x in the organomagnesium compound $R_x^1MgY_{2-x}$ can be predetermined.

The proportion of the at least one organomagnesium compound which is added to the at least one particulate support material may be varied within wide limits depending inter alia on the at least one particulate support material and on any heat treatment to which it has been subjected and on the nature of the at least one organomagnesium compound. Where an organomagnesium compound $R^1MgR^2$ is added to the at least one particulate support material it may be added in excess of that required to saturate the surface of the at least one particulate support material; preferably sufficient of the at least one organomagnesium compound $R^1MgR^2$ is used to react with at least 50% of the reactive sites on the at least one particulate support material. The at least one organomagnesium compound $R^1MgR^2$ is typically added in a proportion in the range 0.01 millimoles/gram of the at least one particulate support material up to saturation of the at least one particulate support material, for example 0.5 millimoles/gram up to saturation and suitably 1 to 8 millimoles/gram of the at least one particulate support material. Where an organomagnesium compound $R_x^1MgY_{2-x}$ is added to the at least one particulate support material it may be added in excess of that required to saturate the surface of the at least one particulate material, and is conveniently in excess of 1 mole of the organomagnesium compound for each mole of the reactive sites present on the at least one particulate support material. When excess of the at least one organomagnesium compound is used the excess is removed, for example by washing with a suitable solvent, before carrying out the next step in the preparation of the catalyst component of the present invention.

As examples of the at least one cleavage agent we may mention, inter alia, oxygen, carbon dioxide, aldehydes, ketones, thioketones, esters, thioesters and protic agents. Typically, protic agents are water, mineral acids, e.g. sulphuric acid, hydrogen sulphide, carboxylic acids, alcohols, thioalcohols, phenols, ammonia, amines and acetylacetone.

In the first preferred embodiment of the present invention, the at least one cleavage agent is preferably an aliphatic alcohol containing from 1 to 6 carbon atoms, for example methanol, ethanol, n-propanol, isopropanol and the butanols. More preferably the cleavage agent is n-butanol. In the second preferred embodiment of the present invention, satisfactory results have been obtained using a phenol, an amine or a carboxylic acid as the at least one cleavage agent.

In the first preferred embodiment of the present invention we have found that, where the amount of the at least one cleavage agent which is added to the product of the reaction of the at least one organomagnesium compound $R^1MgR^2$ with the at least one particulate support material is sufficient to cleave at least about half the carbon-magnesium bonds in the aforesaid product, there is an increase in the activity of catalysts prepared therefrom. Furthermore, we have found that where the amount of cleavage agent is insufficient to cleave more than about 10% of the aforesaid carbon-magnesium bonds, catalysts can be prepared therefrom which give polymers of broader molecular weight distribution.

Where an excess of the at least one cleavage agent is used in the first preferred embodiment of the present invention, the excess is removed by, for example, washing the at least one particulate support material (after treatment with the at least one organomagnesium compound and the at least one cleavage agent) with a suitable solvent or by sparging a slurry thereof with an inert gas, before carrying out the next step.

In the second preferred embodiment of the present invention, the molar ratio of the at least one cleavage agent to the at least one organomagnesium compound is typically about one to one.

Where the at least one particulate support material is treated with the at least one cleaveage agent prior to treatment with the at least one organomagnesium compound, the at least one cleavage agent may, for example, be absorbed onto the at least one particulate support material from a solution of the at least one cleavage agent in a suitable solvent or it may be passed in gaseous form through the at least one particulate support material. However, with this order of addition it is often difficult to control the amount of the at least one cleavage agent which is absorbed on the at least one particulate support material.

The optimum proportion of the at least one cleavage agent will be dependent upon a number of factors including the nature of the support, particularly the drying temperature, and the manner in which the transition metal composition is used. Thus, in the polymerisation of ethylene in the gas phase, the result obtained using a transition metal composition in which the particulate support material is alumina dried at above 500° C. and butanol is used as the cleavage agent in an amount sufficient to cleave about half of the carbon-magnesium bonds is superior to the result obtained using a transition metal composition in which the particulate support material is alumina dried at below 250° C. and butanol is used as the cleavage agent in an amount sufficient to cleave at least 80% of the carbon-magnesium bonds. However, in contrast to this behaviour, both of the foregoing transition metal compositions give similar results when used in the polymerisation of ethylene in the presence of an inert liquid diluent.

The at least one transition metal compound of Groups IVA, VA or VIA of the Periodic Table which is used in the preparation of the catalyst component of the present invention is conveniently a compound of formula $MO_aR_b^4X_n$ wherein:

M is a transition metal of Group IVA, VA or VIA of the Periodic Table;

X is a halogen atom other than fluorine;

$R^4$ is a hydrocarbyl radical, a substituted hydrocarbyl radical or a group $OR^5$;

$R^5$ is a hydrocarbyl radical or substituted hydrocarbyl radical;

n is 0 or a number up to the valency of M;

a is 0 or 1;

b is 0 or a number up to the valency of M; and $2a+b+n=$ the valency of M.

The at least one transition metal compound of formula $MO_aR_b^4X_n$ can be a metal halide, a metal oxyhalide, a metal hydrocarbyl or a metal hydrocarbyloxy compound, and may include a mixture of substituents attached to the metal atom. The metal halides and oxyhalides are known as components of olefin polymerisation catalyst systems and include compounds of titanium, vanadium and zirconium such as vanadium oxytrichloride ($VOCl_3$) and titanium tetrachloride. Metal hydrocarbyloxy compounds include metal alkoxy compounds and metal alkoxy halide compounds such as tetrakis(ethoxy)titanium and bis(isopropoxy)titanium dichloride. Metal hydrocarbyl compounds include a wide range of compounds examples of which are disclosed, in association with a particulate support material, in British Patent Specification Nos. 1,314,828 and 1,513,673 and include zirconium tetrabenzyl and zirconium tetraneophyl. Preferably, the at least one transition metal compound $MO_aR_b^4X_n$ contains at least one halogen atom.

The at least one organomagnesium compound $R^1MgR^2$ or $R_x^1MgY_{2-x}$ is conveniently added to the at least one particulate support material as a liquid medium. The at least one particulate support material is conveniently suspended in an inert liquid such as an aliphatic hydrocarbon and to this suspension is added the liquid medium containing the at least one organomagnesium compound. The liquid media which are used for dissolving the at least one magnesium compound and suspending the at least one particulate support material, are inert liquids such as hydrocarbon liquids, for example hexane, heptane, octane, decane, dodecane or mixtures of the isomers thereof or inert halohydrocarbons, such as chlorobenzene.

The at least one organomagnesium compound $R^1MgR^2$ or the at least one cleavage agent, or a mixture, or product of the at least one organomagnesium compound $R^1MgR^2$ and the at least one cleavage agent, i.e. $R_x^1MgY_{2-x}$, can be added to the at least one particulate support material at any suitable temperature. For example, the at least one organomagnesium compound $R^1MgR^2$ or the product of the at least one organomagnesium compound $R^1MgR^2$ and the at least one cleavage agent (i.e. an organomagnesium compound $R_x^1MgY_{2-x}$) may be added to the at least one particulate support material at a temperature in the range 0° C. to 100° C. and the at least one cleavage agent may be added to the at least one particulate support material at a temperature in the range −80° C. up to 100° C., and conveniently at ambient temperature. After the aforesaid addition, treatment is conveniently effected by allowing the materials to remain in contact for at least 5 minutes and not more than 20 hours, for example 1 to 6 hours.

Where the at least one particulate support material is treated with the at least one organomagnesium compound $R^1MgR^2$ prior to treatment with the at least one cleavage agent the at least one cleavage agent can be added to the at least one particulate support material at any suitable temperature, for example from 0° up to 100° C. and conveniently at ambient temperature. After the aforesaid addition, treatment is conveniently effected by allowing the materials to remain in contact for at least a few minutes and up to several hours, for example 30 minutes to 20 hours, particularly up to 2 hours.

The at least one transition metal compound used in the preparation of the catalyst component of the present invention is preferably added, neat, to the at least one particulate support material (which has been treated with the at least one organomagnesium compound and the at least one cleavage agent) at ambient temperature and the materials are stirred at elevated temperature, preferably 50° C. to reflux, from 5 minutes to 12 hours, preferably 30 minutes to 3 hours. However, we do not exclude the possibility that the aforesaid treatment may be effected in solution in a suitable solvent at a temperature from 0° C. to reflux for a time between a few minutes and 12 hours. After the desired period of contacting, the product is preferably separated from the liquid reaction medium, e.g. by filtration, and washed several times with an inert liquid medium.

The proportion of the at least one transition metal compound where used as a solution in an inert diluent is typically 0.01 to 3.0 millimoles/gram of the at least one particulate support material. The proportion of the at least one transition metal compound where used as a neat liquid is typically 1–40 gram/gram of the at least one particulate support material.

The at least one particulate support material, after treatment with the at least one cleavage agent/organomagnesium compound, and before or after treatment with the at least one transition metal compound of Groups IVA, VA or VIA of the Periodic Table may be treated with an amount of at least one silicon compound containing at least one silicon-hydrogen bond (hereinafter silicon hydride) which is sufficient to provide up to 4 millimoles of silicon-hydrogen bonds for each gram of the particulate support material. The silicon hydride is conveniently a material of the formula $H_cSiR^6_{4-c}$ wherein each $R^6$, which may be the same or different, is a hydrocarbyl group, and c is from 1 to 4. In the silicon hydride, the groups are preferably all the same and are preferably alkyl groups, conveniently containing from 1 to 8 carbon atoms, for example trimethylsilane, tributylsilane, monooctylsilane, or diethylsilane.

It will be appreciated that the treatment with the silicon hydride is optional. The silicon hydride is conveniently added as a liquid medium to the at least one particulate support material before or after it has been treated with the at least one transition metal compound in the preparation of the catalyst component of the present invention. The at least one particulate support material may be suspended in an inert liquid such as an aliphatic hydrocarbon and the liquid medium which contains, or which is, the silicon hydride is added. However, it is preferred to add the silicon hydride to the at least one particulate support material in the essential absence of any inert liquid medium. However, to achieve a uniform dispersion of the silicon hydride on the at least one particulate support material, a solution of the silicon hydride in a volatile solvent, for example pentane, may be used, the solvent subsequently being evaporated off.

The quantity of any silicon hydride which is used is dependent on the amount of the at least one organomagnesium compound, or of the at least one transition metal compound or of the at least one cleavage agent used in the immediately preceding stage. Typically, the silicon hydride is used in an amount to provide at least about one silicon-hydrogen bond for each molecule of the compound used in the immediately preceding stage. The amount of the silicon hydride will be dependent on the number of silicon-hydrogen bonds present in the silicon hydride and is typically sufficient to provide from 0.5 up to 3.0 millimoles of silicon-hydrogen bonds for each gram of the at least one particulate support material.

The silicon hydride, where it is used, is preferably added to the at least one particulate support material at an elevated temperature for example from 100° C. up to 150° C. After adding the silicon hydride to the at least one particulate support material, reaction is conveniently effected by allowing the materials to remain in contact for up to 10 hours, for example 0.5 up to 5 hours. After the desired period of contacting, the at least one particulate support material may be separated from the liquid medium, for example by filtration, decantation, or evaporation and may then be washed one or more times. However, the separation and washing operations are not essential.

The transition metal composition of the present invention contains one or more transition metal compounds, one or more magnesium compounds and possibly one or more organic silicon compounds, reacted with one or more particulate support materials. In the at least one transition metal compound, the transition metal may be substantially all in its original valency or may be partially in a lower valency state. Thus, when the at least one transition metal compound is titanium tetrachloride, it is preferred that the titanium present in the final reaction product is substantially in the tetravalent state but a significant proportion, which may be as much as 60% of the total titanium, can be in a lower valency state, typically the trivalent state.

A further aspect of the present invention provides an olefin polymerisation catalyst which comprises
(a) a transition metal composition as hereinbefore defined and
(b) an activator which is an organometallic compound of metals of groups I–IV of the Periodic Table.

Preferably the activator is an organometallic compound of a metal of Groups IA, IIA, IIB, IIIB or IVB of the Periodic Table, particularly preferably an organo-metallic compound of a metal of Group IIA of the Periodic Table or of aluminium or a complex of an organometallic compound of a metal of Group IA or Group IIA of the Periodic Table with an organometallic compound of aluminium.

The activator may be a magnesium-containing compound of the formula $MgR^7_f Z_{2-f}$ or may be a complex of a magnesium compound with an aluminium compound of the formula $MgR^7_f Z_{2-f} \cdot gAlR^7_h Z_{3-h}$ wherein:
each $R^7$, which may be the same or different, is a hydrocarbyl radical;
each Z, which may be the same or different, is a group $OR^5$ or a halogen atom other than fluorine;
$R^5$ is as hereinbefore defined;
f has a value of greater than 0 up to 2;
g has a value of greater than 0 up to 2; and
h has a value of from 0 to 3.

Where the activator is a complex of a metal of Group IA with an organic aluminium compound, this compound may be of the type lithium aluminium tetraalkyl. It is preferred that the activator is an organic aluminium compound which may be, for example, an aluminium hydrocarbyl halide such as a dihydrocarbyl aluminium halide, an aluminium hydrocarbyl sulphate, or an aluminium hydrocarbyl hydrocarbyloxy but is preferably an aluminium trihydrocarbyl or a dihydrocarbyl aluminium hydride. The aluminium trihydrocarbyl is preferably an aluminium trialkyl in which the alkyl group contains from 1 up to 8 carbon atoms and is particularly an ethyl or octyl group.

It will be appreciated that sufficient of the said activator is employed to transform the metal atoms of the transition metal compound known to be useful in forming Ziegler-Natta catalysts to an active state.

The catalyst components of the present invention may be treated with the aforesaid activator by methods known in the art, for example, they may be reacted totally outside or inside the polymerisation vessel in which the catalyst is to be used or activation may be effected partially outside the polymerisation vessel and completed inside the said polymerisation vessel.

Where an aluminium trihydrocarbyl compound is used as an activator, it is often preferred that the catalyst system also includes a Lewis Base compound if the catalyst system is to be used to polymerise a higher olefin monomer such as propylene. The Lewis Base compound can be any organic Lewis Base compound which has been proposed for use in a Ziegler polymerisation catalyst and which affects either the activity or stereospecificity of such a system. Thus, the Lewis Base compound may be an ether, an ester, a ketone, an alcohol, an ortho-ester, a thioether, a thioester, a thioketone, a thiol, a sulphone, a sulphonamide, a fused ring compound containing a heterocyclic sulphur atom, an organo-silicon compound such as a silane or siloxane, an amide such as formamide, urea and the substituted derivatives thereof such as tetramethylurea, thiourea, an alkanolamine, an amine, a cyclic amine such as pyridine or quinoline, a diamine such as tetramethylethylenediamine or an organo-phosphorus compound such as an organo-phosphine, an organo-phosphine oxide, an organo-phosphite or an organo-phosphate. The use of organo-Lewis Base compounds is disclosed, inter alia, in British Patent Specifications 803,198; 809,717; 880,998; 896,509; 920,118; 921,954; 933,236; 940,125; 966,025; 969,074; 971,248; 1,013,363; 1,017,977; 1,049,723; 1,122,010; 1,150,845; 1,208,815; 1,234,657; 1,324,173; 1,359,328; 1,383,207; 1,423,658; 1,423,659 and 1,423,660.

Preferred Lewis Base compounds are esters which may be represented by the formula $R^8COOR^9$, wherein:

$R^8$ is a hydrocarbyl radical which may be substituted with one or more halogen atoms and/or hydrocarbyloxy groups; and $R^9$ is a hydrocarbyl radical which may be substituted by one or more halogen atoms.

The groups $R^8$ and $R^9$ may be the same or different and it is preferred that one, but not both, of the groups $R^8$ and $R^9$ includes an aryl group. The group $R^8$ is conveniently an optionally substituted alkyl or aryl group, for example a methyl, ethyl, or especially a phenyl, tolyl, methoxyphenyl or fluorophenyl group. The group $R^9$ is preferably an alkyl group containing up to 6 carbon atoms, for example an ethyl or a butyl group. It is particularly preferred that $R^8$ is an aryl or haloaryl group and $R^9$ is an alkyl group. Ethyl benzoate and esters of anisic acid (4-methoxybenzoic acid) are examples of esters which may be used.

In addition to, or instead of, the Lewis Base compounds, the catalyst system may also include a substituted or unsubstituted polyene, which may be an acyclic polyene such as 3-methylheptatriene-1,4,6, or a cyclic polyene such as cyclooctatriene, cyclooctatetraene, or cycloheptatriene or the alkyl- or alkoxy-substituted derivatives of such cyclic polyenes, tropylium salts or complexes, tropolone or tropone.

The proportions of catalyst component and activator of the catalyst system can be varied within a wide range as is well known to the skilled worker. The particular preferred proportions will be dependent on the type of materials used and the absolute concentrations of the components but in general we prefer that for each gram atom of transition metal which is present in the catalyst component of the catalyst system there is present at least one mole of the activator and preferably at least 5 moles of the activator for each gram atom of transition metal. The number of moles of the activator for each gram atom of the transition metal in the catalyst component may be as high as 1000 and conveniently does not exceed 500.

When the catalyst system includes a Lewis Base component in addition to the activator, it is preferred that the Lewis Base compound is present in an amount of not more than one mole for each mole of activator and particularly from 0.1 up to 0.5 mole of the Lewis Base compound for each mole of the activator. However, depending on the particular organic metal compound and Lewis Base compound, the proportion of the Lewis Base compound may need to be varied to achieve the optimum catalyst system.

If the catalyst system includes a polyene, it is preferred that the polyene is present in an amount of not more than one mole for each mole of activator, and especially from 0.01 up to 0.20 mole for each mole of activator. If the catalyst system includes both a Lewis Base component and a polyene, it is preferred that both of these materials are together present in an amount of not more than one mole for each mole of activator.

Catalysts in accordance with the present invention can be used to polymerise or copolymerise olefine monomers.

A further aspect of the present invention provides a process for the polymerisation or copolymerisation of an olefinically unsaturated monomer which process comprises contacting, under polymerisation conditions, at least one olefinically unsaturated monomer with a catalyst as hereinbefore defined.

The term "olefinically unsaturated monomer" is intended to include mono-olefins such as ethylene, propylene and 4-methylpentene-1.

Where the catalysts of the present invention are used to initiate the copolymerisation of two or more olefinically unsaturated monomers, the olefinically unsaturated monomers are typically ethylene and propylene together and/or with for example, butene-1, hexene-1, octene-1 or decene-1, 1,3-butadiene or styrene, or mixtures thereof to provide polymers of a desired density.

Polymerisation processes according to the present invention may be carried out by techniques generally used for polymerisation processes of the type using Ziegler catalysts.

The choice of conditions of pressure and temperature for use in polymerisation processes according to the present invention will vary with factors such as the nature of the monomer and catalyst and whether liquid, e.g. bulk or diluent, or gas phase polymerisation is used.

For example, when ethylene is polymerised, pressures from sub-atmospheric to several thousand atmospheres may be used. Low pressure (say from 0.1 to 30 atmospheres) and intermediate pressure (say from 30 to 300 atmospheres) polymerisation may be carried out using conventional equipment; but very high pressure polymerisation must be performed using suitable specialised reactors and pumping equipment. However, since, generally speaking, the higher the pressure the higher the activity, the use of such techniques may be justified. If very high pressures are used, it is preferred that conditions are such that the ethylene feed and polyethylene produced are maintained in a single fluid phase, i.e. the pressure should exceed 500 Kg/cm$^2$ preferably 1000 to 3000 Kg/cm$^2$ and the temperature should be greater than 125° C., say 140°-300° C. Preferably however the polymerisation process of the present invention is carried out at relatively low pressures. Whilst the polymerisation may be effected at atmospheric pressure, it is preferred to use a slightly elevated pressure and thus it is preferred that the polymerisation is effected at a pressure of from 1 kg/cm$^2$ up to 50 kg/cm$^2$, preferably from 5 up to 30 kg/cm$^2$. This type of process is usually operated in a continuous manner.

A wide range of temperatures may be used, but in general low and intermediate pressure ethylene polymerisations are carried out at temperatures in the range 20°–160° C., preferably from 50° C. to 115° C.

The polymerisation process of the present invention may be carried out in the liquid or gaseous phase (i.e. in the essential absence of a liquid medium) and preferably in the gaseous phase. Where polymerisation is effected in the liquid phase, and the monomer is not liquid under the polymerisation conditions, the monomer may be dissolved in a suitable solvent. Examples of suitable solvents are aliphatic or aromatic hydrocarbons; for instance pentane, hexane, heptane, octane, decane, benzene, toluene and mixtures thereof.

The polymerisation process of the present invention may be effected either in a batch manner or on a continuous basis, and the catalyst components of the present invention and the activator therefor may be introduced into the polymerisation vessel separately or the catalyst component and activator may be mixed together before being introduced into the polymerisation reactor.

Preferably, however, the polymerisation process of the present invention is effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidised by the continuous flow of the gaseous monomer, and gaseous diluent to remove heat of polymerisation through the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The said gas is passed through a heat exchanger wherein it is stripped of the heat of polymerisation, compressed in a compressor and then returned to the reaction zone.

Chain transfer agents may be used in polymerisation processes according to the present invention, and when ethylene is polymerised their use is normally desirable as the polyethylene produced is of very high molecular weight. Examples of chain transfer reagents include hydrogen and zinc dialkyls, e.g. zinc diethyl. Where a chain transfer agent is employed it is conveniently used in accordance with usual practice. For example, where hydrogen is used as the chain transfer agent in the polymerisation of propylene, it is conveniently used in an amount of from 0.01 up to 5.0%, particularly from 0.05 up to 2.0% molar relative to the monomer. When the monomer being polymerised is ethylene, or a mixture in which ethylene is a major polymerisable component (by moles), the amount of hydrogen used may be greater, for example, in the homopolymerisation of ethylene the reaction mixture may contain in excess of 50% molar of hydrogen, whereas if ethylene is being copolymerised, a proportion of hydrogen which is typically up to 35% molar is used. The amount of chain transfer agent will be dependent on the polymerisation conditions, especially the temperature.

The polymerisation process of the present invention is preferably effected under an atmosphere of an inert gas, e.g. nitrogen, or of the monomer to be polymerised. It is also preferred to effect the process using apparatus and solvents which have been carefully freed from impurities, such as oxygen, water and other substances which would otherwise react with the initiators.

It will be appreciated that the particle form of the polymer obtained is dependent upon, and hence is affected by, the particle form of the at least one particulate support material which is used in the production of the catalyst component of the present invention. Hence, by the selection of a particulate support material having an appropriate particle form, such as essentially spherical particles, a polymer of a desired form may be obtained.

Various aspects of the present invention will now be described with reference to the following Examples which are illustrative of the invention. In the Examples, all operations are effected under an atmosphere of nitrogen unless otherwise indicated. All the glass apparatus was dried in an air oven at 120° C. for at least one hour and purged with nitrogen before use. Hexane and heptane were purified by passage through reduced R3-11 copper catalyst (ex. BASF) and 5 A molecular sieve and finally by sparging with pure nitrogen immediately before use. Ethylene was purified by passage through R3-11 copper catalyst and 5 A molecular sieve. Hydrogen was purified by passage through a catalytic deoxygenation unit and 5 A molecular sieve.

(A) PREPARATION OF ORGANOMAGNESIUM COMPOUNDS OF FORMULA $R_x{}^1MgY_{2-x}$

To a 0.62 M solution of dibutyl magnesium (an equimolar mixture of primary and secondary dibutyl magnesium) in an isoparaffin fraction, essentially all of which had a boiling temperature in the range from 117° C. up to 135° C. (hereafter referred to simply as the isoparaffin fraction) was added approximately the same volume of an organic solvent. To the solution obtained was added an undiluted alcohol or amine, or a solution of a phenol. The mixture obtained was treated under the reaction conditions specified in Table 1, in which table are also set out further details of the preparations, including the type of alcohol, phenol or amine used, and the quantity thereof.

TABLE 1

| Preparation No. | Organic Solvent | Reaction conditions | Additive Type | Amount (Mole/Mole dibutyl magnesium) |
|---|---|---|---|---|
| A1 | H | i | NBA | 1.0 |
| A2 | H | i | NBA | 1.3 |
| A3 | H | i | NBA | 0.5 |
| A4 | T | i | IPA | 1.0 |
| A5 | H | ii | TBMP | 1.0 |
| A6 | H | iii | DEA | 1.0 |

NBA is n-butanol.
IPA is iso-propanol.
TBMP is 2,6-di-t-butyl-4-methylphenol.
DEA is diethylamine.

H is a heptane fraction, essentially all of which had a boiling point in the range 99° C. to 102° C. (hereinafter referred to as the heptane fraction)

T is toluene.

(i) The mixture was stirred at ambient temperature (about 20° C.) for 10 minutes, heated to 70° C., maintained at 70° C. for 30 minutes and allowed to cool.

(ii) TBMP was added as a concentrated solution in the isoparaffin fraction and the mixture was stirred at ambient temperature for one hour.

(iii) The mixture was stirred at ambient temperature for 10 minutes.

(B) TREATMENT OF SILICA

A sample of silica (Davison 952 grade from W R Grace and Company of Maryland, USA) was heated up to 350° C. under nitrogen at atmospheric pressure, maintained at 350° C. for two hours and then allowed to cool, in the oven, to ambient temperature.

(C) TREATMENT OF ALUMINA

A sample of hydrated alumina (Ketjen Grade B, obtainable from Akzo Chemie of Amsterdam, Holland) was heated up to 500° C. under nitrogen at atmospheric pressure, maintained at 500° C. for four hours and then allowed to cool, in the oven, to ambient temperature.

(D) TREATMENT OF ALUMINA

The procedure of (C) was repeated using a temperature of 700° C.

(E) TREATMENT OF ALUMINA 60 grams of a sample of the hydrated alumina used in treatments (C) and (D) were suspended in one liter of an aliphatic hydrocarbon fraction consisting essentially of dodecane isomers, essentially all of which have a boiling point in the range 170° C. to 185° C. (hereafter referred to simply as the hydrocarbon fraction). The suspension was heated to a temperature of about 180° C. and maintained at that temperature until about two-thirds of the hydrocarbon fraction had distilled off. The suspension was filtered and the solid was washed twice at ambient temperature using 200 ml of the heptane fraction. The solid was then suspended in 200 ml of the heptane fraction.

(F) TREATMENT OF ALUMINA

A slurry of 100 grams of a sample of the hydrated alumina used in treatments C, D and E in 1 liter of the hydrocarbon fraction was heated to reflux and 300 ml of the liquid was distilled off. The residue was cooled, the alumina was filtered off, washed with hexane and dried under vacuum.

TREATMENT OF SILICA

The procedure of treatment B was repeated using a temperature of 250° C.

(H) TREATMENT OF ALUMINA

The procedure of treatment C was repeated except that the sample was maintained at 500° C. for 2 hours.

EXAMPLE 1

12.1 grams of the silica (dried as described in treatment (B)), were suspended in 50 ml of the heptane fraction. A sufficient quantity of the solution obtained by the process of preparation A1 was added to provide 3 millimoles of the organomagnesium compound for each gramme of silica. The resulting mixture was stirred for one hour at 25° C. and then filtered. The residue was washed five times at ambient temperature (about 20° C.) using 100 ml of the heptane fraction for each wash. 100 ml of titanium tetrachloride were added and the mixture was stirred, heated to 80° C. and maintained at that temperature for four hours. The resulting mixture was allowed to cool and was then filtered. The solid residue was washed eight times using 100 ml of the heptane fraction at ambient temperature for each wash and then suspended in 100 ml of the heptane fraction. The suspension was subjected to analysis to determine the total amount of titanium and the proportion of reduced titanium in the product.

EXAMPLE 2

The procedure of Example 1 was repeated except that 11.7 grams of silica were used and, after adding the organomagnesium compound and washing, the solid was suspended in 100 ml of the heptane fraction and allowed to stand overnight. The heptane fraction was then filtered off and the solid was then treated with titanium tetrachloride as described in Example 1.

EXAMPLE 3

The procedure of Example 1 was repeated with the exception that 11.7 grams of silica were used, the mixture of silica and the organomagnesium compound was stirred for only 15 minutes and was then filtered, and after treatment with titanium tetrachloride the solid residue was washed with the heptane fraction at 80° C.

EXAMPLE 4

The procedure of Example 1 was repeated with the following exceptions, 15.6 grams of silica were used, and the mixture of silica and the organomagnesium compound was heated up to 70° C., maintained at 70° C. for two hours, cooled and filtered. The washed residue was treated using 150 ml of titanium tetrachloride and the solid residue then obtained was washed with the heptane fraction at 80° C.

EXAMPLE 5

The procedure of Example 1 was repeated with the exception that 12.0 grams of silica were used, the solution obtained by the process of preparation A2 was used to provide the organomagnesium compound and after treatment with titanium tetrachloride the solid residue was washed with the heptane fraction at 80° C.

EXAMPLE 6

The procedure of Example 1 was repeated with the exception that 9.32 grams of silica were used, the solution obtained by the process of preparation A3 was used to provide the organomagnesium compound and after treatment with titanium tetrachloride the solid residue was washed with the heptane fraction at 80° C.

EXAMPLE 7

The procedure of Example 1 was repeated using a sufficient quantity of the suspension of alumina obtained in treatment (E) to provide 14.2 grams of alumina, the treatment with titanium tetrachloride used 150 ml of titanium tetrachloride and the solid residue then obtained was washed with the heptane fraction at 80° C.

EXAMPLE 8

The procedure of Example 1 was repeated with the exception that 11.0 grams of the alumina dried as described in treatment (C) were used and after treatment with titanium tetrachloride the solid residue was washed with the heptane fraction at 80° C.

EXAMPLE 9

The procedure of Example 1 was repeated with the exception that 12.2 grams of the alumina dried as described in treatment (D) were used and, after treatment with titanium tetrachloride, the solid residue was washed with the heptane fraction at 80° C.

EXAMPLE 10

The procedure of Example 1 was repeated with the exception that 6.9 grams of silica were used, the solution obtained by the process of preparation A4 was used to provide the organomagnesium compound and, after treatment with titanium tetrachloride, the solid residue was washed with the heptane fraction at 80° C.

EXAMPLE 11

The procedure of Example 1 was repeated with the exception that 7.5 grams of silica were used, the solution obtained by the process of preparation A5 was used to provide the organomagnesium compound and, after treatment with titanium tetrachloride, the solid residue was washed with the heptane fraction at 80° C.

EXAMPLE 12

The procedure of Example 1 was repeated with the exception that 9.0 grams of silica were used, the solution obtained by the process of preparation A6 was used to provide the organomagnesium compound and, after treatment with titanium tetrachloride, the solid residue was washed with the heptane fraction at 80° C.

EXAMPLE 13

The procedure of Example 1 was repeated with the exception that 9.5 grams of silica were used and the product of contacting the silica with the organomagnesium compound was treated with a silicon hydride in the following manner.

The product of contacting silica and the organomagnesium compound was filtered and washed as described in Example 1 and was then washed twice more using 100 ml of n-pentane at ambient temperature for each wash. The solid was then dried by pumping to dryness at ambient temperature.

A solution of mono-octylsilane in n-pentane was added to the essentially dry solid product. The mono-octylsilane was added in an amount of 0.9 millimole of the silane per gramme of silica. The pressure was reduced to remove most of the pentane and nitrogen was then introduced to restore the pressure. The solid was then heated to 110° C., without stirring, and the temperature of 110° C. was maintained for four hours. The solid was allowed to cool, washed once with 100 ml of the heptane fraction at ambient temperature and was then treated with titanium tetrachloride as described in Example 1.

EXAMPLE 14

A sample of the product of Example 3 was washed twice using 100 ml of n-pentane at ambient temperature for each wash, dried at reduced pressure and ambient temperature, and treated with a silicon hydride.

Undiluted mono-octylsilane was added to a sufficient quantity of the product of Example 3 to provide 7.6 grams of silica. The amount of silane used was 0.7 millimole of the silane per gram of silica and the mixture was then heated to 110° C., the procedure otherwise being as described for the silane treatment of Example 13.

EXAMPLES 15 to 28

These examples illustrate the use of catalyst components of the second preferred embodiment of the present invention.

Into a stirred stainless steel autoclave of 30 liters capacity were introduced, under hydrogen at a pressufre of 4.2 kg/cm² gauge, 13 liters of a mixture of hexane and butene-1. The mixture also contained 40 millimoles of aluminium trioctyl and 50 ppm by weight of an antistatic agent of the formula $C_6F_{13}$ $O(CH_2CH_2O)_8C_nH_{(2n+1)}$ where n has a value of from 16 to 18.

The contents of the reactor were stirred and heated up to 80° C. and then the reactor was vented to reduce the total pressure to 2.54 kg/cm² gauge. Ethylene was added to give a total pressure of 5.6 kg/cm² gauge. A titanium-containing component obtained as described in one of Examples 1 to 14 was then added in a quantity to attain, and subsequently to maintain, a monitored ethylene consumption of between 1.0 and 1.5 kg per hour. Ethylene was added at a rate sufficient to maintain the pressure of 5.6 kg/cm² gauge. During the reaction, unless otherwise indicated, a 0.1 M solution of aluminium trioctyl in hexane was added continuously at a rate of 40 millimoles per hour.

The polymerisation was terminated and the polymer product consequently recovered by transferring to a vessel of 200 liters capacity containing 50 liters of a 0.01 N agueous solution of sodium hydroxide and then passing steam through the stirred mixture until all of the hexane had been evaporated. The aqueous polymer suspension was then filtered and the polymer was dried in a fluid bed drier using hot nitrogen as the fluidising gas.

Further details of the polymerisations, including the nature of the catalyst component and the results obtained, are set out in Table 2.

TABLE 2

| Example No. | Prepared in Example No. | Ti Composition | | | Wt % B-1 (f) | Product | | | Catalyst Activity (k) |
| | | Total Ti (mM/g) (c) | Red Ti (%) (d) | Amount (mM) (e) | | MFI (h) | Density (kg/m³) (i) | S.Ex. (j) | |
| --- | --- | --- | --- | --- | --- | --- | --- | --- | --- |
| 15 | 1 | 1.07 | 29.0 | 1.48 | 8.04 | 2.10 | 922.2 | 1.60 | 336 |
| 16 | 2 | 1.16 | 8.5 | 1.05 | 7.16 | 2.30 | 918.7 | 1.47 | 465 |
| 17 | 3 | 1.48 | 11.6 | 0.98 | 6.98 | 5.01 | 920.6 | 1.37 | 434 |
| 18 | 4 | 1.03 | 13.0 | 1.68 | 7.69 | 7.10 | 917.0 | 1.35 | 284 |
| 19 | 5 | 1.33 | 19.4 | 3.90 | 7.34 | 6.0 | 919.8 | 1.42 | 111 |
| 20 | 6 | 2.00 | 28.5 | 2.45 | 6.63 | 3.18 | 921.2 | 1.45 | 136 |

TABLE 2-continued

| Example No. | Prepared in Example No. | Ti Composition Total Ti (mM/g) (c) | Ti Composition Red Ti (%) (d) | Amount (mM) (e) | Wt % B-1 (f) | Product MFI (h) | Product Density (kg/m³) (i) | S.Ex. (j) | Catalyst Activity (k) |
|---|---|---|---|---|---|---|---|---|---|
| 21 | 7 | 0.92 | 5.4 | 2.22 | 6.98 | 2.78 | 929.4 | 1.40 | 219 |
| 22 | 8 | 0.88 | 17.9 | 3.12 | 7.69 | 2.18 | 924.8 | 1.60 | 101 |
| 23 | 9 | 0.71 | 59.8 | 0.81 | 7.34 | 6.6 | 921.6 | 1.39 | 516 |
| 24 | 10 | 1.46 | 17.0 | 1.45 | 8.04 | 6.7 | 917.6 | 1.37 | 272 |
| 25 | 11 | 1.11 | 6.0 | 1.96 | 8.04 | 2.65 | 918.8 | 1.38 | 192 |
| 26 | 12 | 1.56 | 50.0 | 2.65 | 6.98 | 3.81 | 921.2 | 1.32 | 120 |
| 27 | 13 | 1.40 | 5.2 | 3.78 | 7.69 | 3.68 | 920.8 | 1.35 | |
| 28 | 14 | 1.48 | 57.0 | 1.67 | 6.98 | 3.3 | 919.0 | 1.36 | 222 |

Notes to Table 2
(c) millimoles of titanium compound per gram of support, estimated colorimetrically.
(d) percentage of titanium having a valency of less than four, determined by addition of excess ceric sulphate solution and back-titration with hydrogen peroxide.
(e) is given as total millimoles of titanium, contained in the product of Examples 1 to 14, and added to initiate and maintain the polymerization.
(f) Expressed as $$\frac{(Wt\ butene\text{-}1) \times 100}{Wt\ initial\ mixture\ of\ butene\text{-}1\ plus\ hexane}$$

(h) MFI is melt flow index measured by ASTM D1234-70 Procedure A at 190° C. using a 2.16 kg weight.
(i) Density was measured as described in ASTM D1928-70, Procedure A, using a density gradient column at 23° C. and includes a correction for the presence of catalyst residues.
(j) S.Ex. is stress exponent and is given by the relationship $$\frac{Log_{10} MFI\ 5 - Log_{10} MFI\ 2.16}{Log_{10} 5 - Log_{10} 2.16}$$

where MFI 5 is the melt flow index measured as in (h) using a 5 kg weight and MFI 2.16 is the melt flow index measured as in (h).
(k) Act is the activity expressed in the units of ethylene consumed/mM titanium/kg.cm$^{-2}$ ethylene pressure/hour.

EXAMPLE 29

(a) Reaction of alumina and dibutyl magnesium 146.5 grams of the alumina dried as described in treatment D were suspended in 1400 ml of the isoparaffin fraction in a two liter jacketted reaction vessel provided with a stirrer. 236 ml of the 0.62M solution of dibutyl magnesium solution used in Preparation A were added to the suspension. The mixture was stirred at ambient temperature for 2.5 hours.

(b) Treatment with n-butanol

To the mixture from step (a) were added 6.7 ml (73 millimoles) of n-butanol and the mixture was stirred at ambient temperature for 2.5 hours and then allowed to stand without stirring overnight. The supernatent liquid was removed by decantation and the excess liquid was removed by forcing it through a glass tube at the lower end of which was located a sintered glass frit.

(c) Treatment with titanium tetrachloride

The filtered solid from step (b) was suspended in 1350 ml of undiluted titanium tetrachloride, the mixture was stirred, heated up to 80° C. and maintained at 80° C. for 1.75 hours. The mixture was allowed to settle and the supernatent liquid was decanted off at 80° C. The solid was washed four times by decantation using 1500 ml of the isoparaffin fraction at 80° C. for each wash and was washed a further six times by decantation using 1500 ml of the isoparaffin fraction at ambient temperature for each wash. The solid was finally suspended in 1500 ml of the isoparaffin fraction at ambient temperature, a portion of the suspension was separated and the remainder was transferred to a jacketted filter vessel, filtered and dried by heating at 50° C. under reduced pressure for 3.5 hours.

EXAMPLE 30

The procedure of Example 29 was repeated with the exception that, in step (b), 73 millimoles of ethanol was used and, at the end of step (c), the whole of the solid product was retained as a suspension in the isoparaffin fraction.

EXAMPLES 31 AND 32

The polymerisation procedure of Examples 15 to 28 was repeated, for 1.5 hours, using the product of Examples 29 and 30. The results obtained are set out in Table 3.

TABLE 3

| Example Number | Ti Composition Prepared in Example No. | Amount used (mM) (e) | % Wt B-1 (f) | Polymer Product Yield (kg) | Polymer Product MFI (h) | Stress Exponent (j) |
|---|---|---|---|---|---|---|
| 31 | 29 | 3.0 | 7.0 | 1.8 | 2.80 | 1.49 |
| 32 | 30 | 4.5 | 7.0 | 2.0 | 1.09 | 1.53 |

Notes to Table 3
Notes (e), (f), (h) and (j) are all as defined in Notes to Table 2.

EXAMPLES 33 AND 34

A 20 cm internal diameter fluidised bed reactor vessel, operated in a continuous manner, was used to produce an ethylene/butene-1 copolymer. A reaction mixture comprising ethylene, butene-1 and hydrogen was circulated continuously through the bed at a superficial velocity estimated to be about four times the minimum necessary for fluidisation. In the fluidised bed, the reaction temperature was controlled at 80° C. by adjusting the temperature of the gas fed to the fluidised bed reactor vessel during a heat exchanger in the circulating gas loop. Aluminium trioctyl was pumped continuously into the reactor as a 0.25 molar solution in n-hexane. The solid reaction product of Example 29 was introduced into the reactor as a dry powder at frequent intervals so as to maintain a rate of polymer production of about 1.5 kg/hr, which corresponds to a mean residence time of four hours. The reaction pressure was maintained automatically by admitting an ethylene/hydrogen mixture through a control valve. Liquid butene-1 was pumped into the circulating gas stream so as to maintain a constant composition as determined by Gas Liquid Chromotography.

The polymer formed was removed periodically so as to maintain an essentially constant level in the reactor vessel. The polymer collected was degassed in a stream of nitrogen which had been passed over a bath of water at ambient temperature, and then through a steam jacket. The use of this warm, moist nitrogen removed monomers and also de-activated the catalyst and alkyl residues.

Further details, together with some characteristics of the polymers obtained, are set out in Table 4.

Titanium tetrachloride, in one or more portions, was added to the solid and after a suitable temperature/time treatment the excess titanium tetrachloride was removed by filtration and the residue was washed with hexane at 60° C. until chlorine could not be detected in the washings. The resulting solid was dried under vacuum to afford a transition metal composition according to the present invention.

Heptane was added to the aforesaid transition metal composition to form a slurry having a concentration of 0.02 milliatoms titanium per milliliter of slurry.

Further details of the preparations, including the type of cleavage agent used and the quantities of reagents used, and analysis of the transition metal compositions prepared are set out in Table 5.

TABLE 4

| Example Number | Rate Addtn. AlOct$_3$ (mM/Hr) | Gas Composition Mole % (l) | | | Rate of Polymer Production (kg/hr) (m) | MFI (h) | Density (kg/m$^3$) (i) | Reaction Pressure (kg/cm$^2$) absolute | S.Ex. (j) |
|---|---|---|---|---|---|---|---|---|---|
| | | Eth. | B-1 | Hg | | | | | |
| 33 | 12.5 | 63.5 | 18.9 | 17.6 | 1.9 | 0.9 | 921 | 12.7 | 1.65 |
| 34 | 12.5 | 56.2 | 21.9 | 21.9 | 1.5 | 0.9 | 922 | 23.5 | 1.55 |

Notes to Table 4
Notes (h), (i) and (j) are all as defined in Notes to Table 2.
(l) Eth is ethylene
B-1 is butene-1
Hg is hydrogen
Mole % is calculated from the relationship:
$$\frac{\text{Mole of gas}}{\text{Mole of eth} + \text{Mole of B-1} + \text{Mole of Hg}} \times 100$$
(m) This is the rate at which polymer is removed from the reactor vessel in order to maintain an essentially constant level in the reactor vessel.

EXAMPLES 35–42

These samples illustrate the preparation of transition metal compositions of the first preferred embodiment of the present invention.

General Procedure

To a slurry of a particulate support material, dried as in one of treatments A-H, in hexane or heptane was added a 0.62 molar solution of dibutyl magnesium in the isoparaffin fraction. Where an excess of the organomagnesium compound was used (Examples 35 and 36) the slurry was filtered after 30 minutes, the solid was washed with hexane to remove unreacted dibutyl magnesium and heptane was added to the solid to form a slurry to which was added a solution of cleavage agent in hexane or heptane. Where the organomagnesium compound was not used in excess, reaction was allowed to proceed for 30 minutes (at which time no magnesium could be detected in solution), the cleavage agent (as a solution in hexane or heptane when it is an alcohol) was then added. After treatment with the cleavage agent the slurry was filtered and the solid filtered off was dried under vacuum.

EXAMPLE 43

This example illustrates the use of water as a cleavage agent in the preparation of a transition metal composition of the present invention.

To a slurry of 82 gms of silica dried as in treatment G in 300 ml of hexane was added 300 ml of 0.62 molar dibutyl magnesium in the isoparaffin fraction. The mixture was stirred at room temperature for 30 minutes, the solid was filtered off and dried. 37.6 gms of the dried solid was transferred to a glass fluid bed and fluidised for 30 minutes in a stream of nitrogen containing 1.8 gm of water.

The silica was then dried for 3 hours at 200° C. by fluidising with dry nitrogen. 11.8 g of the dried silica when then treated with 80 mls of heat titanium tetrachloride with stirring for 2 hours at 80° C. following which the titanium tetrachloride was removed and a second treatment carried out with 60 mls of fresh titanium tetrachloride. After 1 hour at 80° C. the titanium tetrachloride was removed and the solid washed five times with hexane at 80° C. and finally dried to yield a transition metal composition according to the present invention as a pale green powder which was found by analysis to contain 52.7 mgms of titanium per gramme of solid.

TABLE 5

| Ex. No. | Type of support (gms) | Treatment with MgBu$_2$ Soln. | | | Treatment with cleavage agent | | | | | Treatment with TiCl$_4$ | | | Transition Metal Composition 1 gm solid catalyst component contains (mgs) | | |
|---|---|---|---|---|---|---|---|---|---|---|---|---|---|---|---|
| | | Solvent (mls) for slurry | Vol of soln (mls) | Solvent (mls) for slurry | Cleavage Agent | | | | Vol (mls) | Time (mins) | Temp (°C.) | Ti | Mg | Cl |
| | | | | | Type (mls) | Solvent (mls) | Time (mins) | Temp (°C.) | | | | | | |
| 35 | F (15.0) | Hx (60) | 194 | Hp (60) | nBuOH (4.12) | Hx (20) | 30 | 20 | 60 | 120 | 80 | 51.7 | 92.1 | 203.1 |
| 36 | H (15.6) | Hp (60) | 75.5 | Hp (60) | nBuOH (4.58) | Hp (20) | 30 | 20 | 60 50 | 120 5 | 80 80 | 41.7 | 34.3 | 180.8 |

TABLE 5-continued

| | | Treatment with MgBu₂ Soln. | | | Treatment with cleavage agent | | | | | Treatment with TiCl₄ | | | Transition Metal Composition 1 gm solid catalyst component contains (mgs) | | |
|---|---|---|---|---|---|---|---|---|---|---|---|---|---|---|---|
| Ex. No. | Type of support (gms) | Solvent (mls) for slurry | Vol of soln (mls) | Solvent (mls) for slurry | Type (mls) | Cleavage Agent Solvent (mls) | Time (mins) | Temp (°C.) | Vol (mls) | Time (mins) | Temp (°C.) | Ti | Mg | Cl |
| 37 | H (22.1) | Hx (150) | 35.7 | — | nBuOH (6.05) | Hx (20) | 10 | 20 | 60 60 | 150 5 | 80 80 | 43.6 | 18.2 | 160.0 |
| 38 | F (14.0) | Hp (50) | 98 | — | nBuOH (4.53) | Hp (20) | 10 | 20 | 60 | 10 | 20 | 23.2 | 71.7 | 110.6 |
| 39 | F (19.2) | Hp (50) | 136 | — | nBuOH (6.25) | Hp (20) | 10 | 20 | 100 | 120 | 80 | 46.0 | 72.7 | 207.8 |
| 40 | F (16.4) | Hp (50) | 116 | — | nBuOH (5.35) | Hp (20) | 10 | 20 | 80 80 | 120 15 | 80 20 | 39.1 | 72.9 | 201.0 |
| 41 | F (13.0) | Hp (100) | 91.5 | — | EtO₂CPh (10) | — | 60 | 70 | 80 | 120 | 80 | 44.1 | 52.5 | 187.2 |
| 42 | F (18.3) | Hp (100) | 129 | — | Me₂NH (5.3) | — | 60 | 0 | 100 | 120 | 80 | 48.9 | 53.0 | 251.0 |
| CT | E (10.83) | Hp (65) | 130 | — | — | — | — | — | 50 | 120 | 80 | 83.3 | 79.0 | 210.6 |

CT = Comparative Test

EXAMPLE 44

This example illustrates the preparation of a transition metal composition of the present invention in which a particulate support material is treated with a cleavage agent priot to treatment with an organomagnesium compound.

28.5 gms of alumina dried as in treatment H was fluidised with nitrogen in a 25 mm fluid bed at 65° C. 5 mls of methanol were placed in a reservoir at 25° C. which was positioned below the fluid bed and were evaporated by the fluidising nitrogen and passed into the alumina bed. After 1 hour the methanol had evaporated and the weight of the alumina had increased by 1.69 gms.

92 mls of a 0.62 molar solution of dibutyl magnesium in Isopar E was added to a slurry of the methanol-treated alumina in 100 mls of heptane and the mixture was stirred at room temperature for 15 minutes and at 80° C. for 30 minutes. The mixture was cooled and the solid filtered off.

130 mls of titanium tetrachloride were added to the solid and the slurry was heated at 80° C. for 2 hours, filtered and the solids was washed four times with 100 ml portions of heptane, and dried to give a transition metal composition of the present invention. Analysis revealed that 1 gram of the solid contained 54.9 mgs of titanium, 31.8 mgs of magnesium and 163.1 mgs of chlorine.

EXAMPLES 45–57

General Polymerisation Procedure

A stainless steel pressure vessel of 3.8 liter capacity was prepared by heating it to 100° C. and evacuating with an efficient vacuum pump. The vessel was then cooled to 60° C. and 2 liters of purified hexane added. The vessel was then sparged at reaction pressure with about 200 liters of pure ethylene over a period of 30 minutes to remove any residual moisture and oxygen, after which it was vented. 6 mls of a molar solution of aluminium tri-n-octyl (except in Examples 45, 46 and 56 where aluminium tri-iso-butyl was used) in heptane as activator and then the transition metal composition as a slurry were injected against a stream of ethylene. The vessel was then sealed, hydrogen was added at a partial pressure of 1.76 kg/cm² (except in Examples 48 and 53 where the partial pressure was 3.51 kg/cm² and Example 56 where the partial pressure was 4.6 kg/cm²) and the vessel was then pressurised with ethylene to a pressure of 11.57 kg/cm² absolute (except in Examples 46 and 56 where the pressure was 13.68 and 9.1 kg/cm² absolute respectively. Where an ethylene/butene-1 copolymer was prepared 200 mls of butene-1 was added from a Klinger gauge during pressurisation. When full reaction pressure was reached the vessel was stirred at 1000 rpm and polymerisation commenced. Reaction was allowed to continue for 2 hours (except for Examples 48 and 53 where a reaction time of 4 hours was used) at 80° C., during which time ethylene was added as required to maintain the reaction pressure. Afterwards, the reactor was vented and cooled.

The product slurry was removed from the autoclave and to this was added 1 liter of deionised water and 0.02 wt/vol % of sodium di(ethylhexyl) sulphosuccinate (Aerosol OT) calculated on polymer slurry, i.e. diluent, as a wetting agent. Steam at 100° C. was then passed into the stirred vessel at about 25 g per minute and the mixture distilled at a temperature of about 60° C., distillation being continued until no more organic material separated from the distillate. The polymer product, which was granular in form, was then filtered from the aqueous slurry remaining in the distillation vessel, washed with water and dried under vacuum at approximately 60° C.

Further details of the polymerisation procedure including the amount of transition metal composition used, and of the polymeric products are set out in Table 6.

The methyl content of the polymeric products, i.e. methyl groups which are at ends of molecules and those which are at ends of side branches, was measured using a mathematical comparison, by computer, of the absorbance curve from 1310–1430 cm$^{-1}$ with two standard polyethylenes of known methyl count.

Melt flow index (MFI) was determined as described in ASTM D-1238.

Flow Ratio (FR) was determined as in ASTM D1238-70 Procedure A being the ratio of the MFI measured using a 21.6 kg weight with that measured using a 2.16 kg weight both measurements being carried out at 190° C. Density was determined as in Examples 15 to 28.

Powder bulk density was determined by pouring the powder via a ⅜ ins diameter funnel into a 100 ml graduated cylinder to the 100 ml line without shaking them.

Powder bulk density (g/l)=(Wt of cylinder with powder−Wt of empty cylinder)×10

Stress exponent was measured as in Examples 15 to 28.

hexane. The reaction mixture was stirred for 1 hour and the solid was filtered off.

Step C

Titanium tetrachloride and the solid prepared in step B were heated at 80° C. for 2 hours. The reaction mixture was cooled, filtered and the solid was washed 4 times with 100 ml portions of heptane and dried under vacuum to give a transition metal composition of the

TABLE 6

| Ex No. | Transition Metal Composition Prepared in Example | Transition Metal Composition Amount (m Atoms of Ti) | Reaction Conditions Hydrogen Partial Pressure (kg/cm²) | Reaction Conditions Reaction Pressure Absolute (kg/cm²) | Product Type | Product Yield (g) | Product Me content/ 1000 C atoms | Product MFI | Product FR | Product S.Ex | Product Density (g/cc) | Powder Bulk Density (g/l) |
|---|---|---|---|---|---|---|---|---|---|---|---|---|
| 45 | 35 | 0.05 | 1.76 | 11.57 | Copolymer | 250 | 13 | 0.56 | 41 | 1.48 | a | a |
| 46 | 35 | 0.01 | 1.76 | 13.68 | Homo | 428 | a | 0.014 | 56 | a | a | a |
| 47 | 36 | 0.036 | 1.76 | 11.57 | Copolymer | 241 | 13 | 0.54 | 41 | 1.41 | 0.9324 | a |
| 48 | 36 | 0.04 | 3.51 | 11.57 | Homo | 217 | a | 0.61 | 38 | 1.33 | a | 420 |
| 49 | 37 | 0.10 | 1.76 | 11.57 | Copolymer | 339 | 20 | 6.60 | a | 1.38 | 0.9272 | a |
| 50 | 38 | 0.20 | 1.76 | 11.57 | " | 163 | 13 | 1.67 | 29 | 1.30 | 0.9365 | a |
| 51 | 39 | 0.05 | 1.76 | 11.57 | " | 260 | 18 | 3.75 | 31 | 1.31 | 0.9304 | a |
| 52 | 40 | 0.05 | 1.76 | 11.57 | " | 224 | 13 | 1.87 | 32 | 1.35 | 0.9370 | a |
| 53 | 39 | 0.02 | 3.51 | 11.57 | Homo | 125 | a | 0.32 | 49 | 1.53 | a | 442 |
| 54 | 41 | 0.10 | 1.76 | 11.57 | Copolymer | 258 | 18 | 2.80 | 49 | a | 0.9326 | a |
| 55 | 42 | 0.10 | 1.76 | 11.57 | " | 293 | a | 2.10 | 43 | a | 0.9287 | a |
| 56 | 43 | 0.1 | 4.6 | 9.1 | Homo | 675 | a | 9.0 | 37 | a | a | a |
| 57 | 44 | 0.05 | 1.76 | 11.57 | Copolymer | 185 | 14 | 1.08 | 38 | 1.43 | 0.9363 | a |
| CT | CT | 0.02 | 1.76 | 11.57 | " | 65 | 14 | 0.3 | 55 | 1.60 | a | a |

CT: Comparative test
a: not determined

EXAMPLES 58–62

These examples illustrate the preparation of transition metal compositions of the first preferred embodiment of the present invention from a range of cleavage agent concentrations.

Step A 400 mls of a 0.62 molar solution of dibutyl magnesium in isopar E was added to a slurry of 73.5 grams of alumina dried as in treatment H in 160 mls of heptane. After 12 hours stirring, analysis of the solution indicated that 2.88 milliatoms of magnesium had been abstracted from the solution per gram of alumina. The reaction mixture was filtered and the solid was washed 3 times with 500 ml portions of heptane to remove excess dibutyl magnesium and dried under vacuum.

Step B

A solution of n-butanol in 20 mls of heptane was added to a slurry of the solid prepared in Step A in present invention. Details of the preparation and analysis of the transition metal composition are given in Table 7.

EXAMPLES 63–67

These examples illustrate the effect which varying the amount of cleavage agent used in the preparation of transition metal compositions of the present invention has on catalyst activity and molecular weight distribution.

Preparation of ethylene/butene-1 copolymers was effected using the transition metal composition prepared in Examples 58 to 62 in the general procedure described in Examples 45 to 57.

The results are given in Table 8 from which it can be seen that as the amount of cleavage agent is increased to more than that required to cleave 50% of the magnesiumcarbon bonds in the product of the reaction of alumina with magnesium dibutyl there is an increase in catalyst activity and that where the amount of cleavage agent is less than that required to cleave 10% of the aforesaid bonds, the catalyst gives polymer of broader molecular weight distribution.

TABLE 7

| Example No. | Step B Wt. of Product from Step A (gms) | Step B Vol. of Hexane (mls) | Step B Vol. of n-butanol (mls) | Step B Percentage of Mg—Bu bonds which BuOH can attack | Step C Vol. of TiCl₄ (mls) | Transition Metal Composition 1 gm of catalyst component contains (mgs) Ti | Transition Metal Composition 1 gm of catalyst component contains (mgs) Mg | Transition Metal Composition 1 gm of catalyst component contains (mgs) Cl |
|---|---|---|---|---|---|---|---|---|
| 58 | 15.77 | 150 | 0.29 | 7 | 79 | 76.6 | 38.3 | 316.0 |
| 59 | 14.43 | 160 | 0.66 | 18 | 72 | 64.7 | 42.0 | 197.8 |
| 60 | 15.48 | 100 | 1.42 | 36 | 78 | 59.1 | 45.1 | 180.9 |
| 61 | 14.43 | 100 | 2.65 | 71 | 73 | 41.3 | 46.4 | 170.3 |
| 62 | 13.91 | 150 | 4.83 | 100 | 70 | 37.2 | 39.9 | 159.6 |

TABLE 8

| Example No. | Transition Metal Composition | | Product | | | | | | Catalyst Activity (gms polymer/ m.atom Ti) |
|---|---|---|---|---|---|---|---|---|---|
| | Prepared in Ex. No. | Amount used (m.atoms Ti) | Yield (gms) | Me content/ 1000C atoms | M.F.I. | F.R. | S.Ex | Density | |
| 63 | 58 | 0.02 | 45 | 12 | 0.4 | 51 | 1.49 | a | 2250 |
| 64 | 59 | 0.05 | 158 | 15 | 1.4 | 40 | 1.41 | 0.9438 | 3160 |
| 65 | 60 | 0.05 | 221 | 19 | 2.7 | 40 | 1.46 | 0.9322 | 4420 |
| 66 | 61 | 0.02 | 126 | 18 | 1.7 | 42 | 1.45 | a | 6300 |
| 67 | 62 | 0.05 | 252 | 19 | 2.8 | 36 | 1.43 | 0.9354 | 5040 | a: not determined
Methyl content/1000C atoms, melt flow index (MFI), flow ratio (FR), stress exponent were measured as in Examples 45 to 57.

EXAMPLE 68

48.9 ml of a 0.67 M solution of magnesium dibutyl in the isoparaffin fraction, 3.4 ml of diethylamine and 60 ml of the heptane fraction were mixed together at ambient temperature and stirred for ten minutes.

10.83 g of alumina (dried as described in treatment C)) were suspended in 50 ml of the heptane fraction and to this stirred suspension was added the product obtained by mixing magnesium dibutyl, diethylamine and the heptane fraction as hereinbefore described. The resulting mixture was stirred for one hour at ambient temperature, filtered and the solid residue was washed five times using 100 ml of the heptane fraction at ambient temperature for each wash.

The solid was then suspended in 100 ml of titanium tetrachloride, stirred, heated up to 80° C. and maintained at this temperature with stirring for four hours. The hot mixture was filtered and the solid washed eight times using 100 ml of the heptane fraction at 80° C. for each wash. The solid was finally suspended in 100 ml of the heptane fraction at ambient temperature.

EXAMPLE 69

The procedure of Example 68 was repeated with the changes noted hereafter.

A mixture of 58.3 ml of the magnesium dibutyl solution, 4.2 ml of N-methylaniline and 60 ml of the heptane fraction was produced. This mixture was added to a suspension containing 12.9 g of the silica dried as described in treatment B).

EXAMPLE 70

51.3 ml of the magnesium dibutyl solution as used in Example 68 was evaporated under reduced pressure falling to 0.1 mm of mercury to remove the solvent and the solid residue was suspended in 500 ml of toluene. To this suspension was added a solution of 4.2 g of benzoic acid in 100 ml of toluene. The mixture was stirred at 80° C. for 0.5 hours to effect reaction and the hot solution obtained was then filtered. The solution was then added to a suspension of 11.37 g of silica in 100 ml of toluene and this mixture was stirred at ambient temperature for one hour. The mixture was filtered and the solid was washed twice using 100 ml of toluene at ambient temperature for each wash and then three times using 100 ml of the heptane fraction at ambient temperature for each wash.

The solid was then contacted with titanium tetrachloride, washed and finally suspended using the procedure described in Example 68.

EXAMPLE 71

8.45 g of the silica dried as described in treatment (B) were suspended in 50 ml of the heptane fraction. 40.9 ml of a 0.62 M solution of magnesium dibutyl was added to the suspension, the mixture was stirred at ambient temperature for one hour and then filtered. The solid was then washed five times using 100 ml of the heptane fraction at ambient temperature for each wash. The solid was then suspended in 100 ml of the heptane fraction at ambient temperature.

To the suspension obtained as described were added 1.2 ml of thiophenol ($C_6H_5SH$) and the mixture was stirred for two hours at ambient temperature. The mixture was allowed to stand for 20 hours without stirring, then a further 0.5 ml of thiophenol was added, the mixture was stirred for 30 minutes at ambient temperature, heated up to 80° C. and stirred at 80° C. for 30 minutes. The mixture was then filtered and the solid was washed six times using 100 ml of the heptane fraction at ambient temperature for each wash.

140 ml of tetanium tetrachloride were added to the washed solid, the mixture was stirred, heated up to 80° C. and maintained at this temperature for four hours. The hot mixture was filtered, the solid was resuspended in a further 140 ml of titanium tetrachloride, the mixture was stirred, heated up to 80° C. and maintained at this temperature for 30 minutes. The hot mixture was filtered and the solid was washed eight times using 100 ml of the heptane fraction at 80° C. for each wash. The solid was finally suspended in 100 ml of the heptane fraction.

EXAMPLES 72 TO 75

1.5 liters of the hydrocarbon fraction were added to a five liter stainless steel autoclave and were purged with nitrogen and evacuated at 80° C., this procedure being repeated three times and the autoclave was then evacuated to a pressure of 0.1 mm of mercury whilst stirring vigorously. Stirring was continued and ethylene was introduced to raise the pressure to one atmosphere. 16 $cm^3$ of a solution, in the hydrocarbon fraction, containing 16 millimoles of triethyl aluminium were added. Then, a quantity of the suspension of the product of one of Examples 68 to 71 was added. The autoclave was pressurised to a pressure of 1.76 kg/$cm^2$ gauge with hydrogen and ethylene was then added to give a total pressure of 7 kg/$cm^2$ gauge. Polymerisation was continued at 80° C. for two hours and ethylene was added to maintain the pressure at 7 kg/$cm^2$ gauge. Polymerisation was then terminated by venting off the excess ethylene and exposing the contents of the autoclave to air. Further details of the quantity of the titanium component used, and the amount of polymer obtained is given in Table 9.

TABLE 9

| Example | Ti Compn. Type | Amount (ml) | Wt Polymer (g) | MFI | S. Ex |
|---------|------|------|-------|-------|-------|
| 72 | 68 | 2.0 | 265.6 | 0.18 | 1.58 |
| 73 | 69 | 1.5 | 204.8 | 0.085 | 1.46 |
| 74 | 70 | 1.5 | 84.4 | 0.07 | 1.52 |
| 75 | 71 | 2.0 | 264.1 | 0.24 | 1.46 |

The titanium composition was added as a measured quantity (number of ml) of the suspension obtained as the product of one of Examples 68 to 71. Melt flow index (MFI) and stress exponent (S. Ex) were measured as in Examples 15 to 28.

We claim:

1. A transition metal composition which is the product of treating at least one particulate support material, with
   (a) at least one organomagnesium compound of formula $R^1MgR^2$ in which $R^1$ and $R^2$, which may be the same or different, are hydrocarbyl groups,
   (b) at least one agent which is (a) capable of reacting with the product obtained by treating the at least one particulate support material with the at least one organomagnesium compound to cleave at least a proportion of the carbonmagnesium bonds in the said product, and (b) does not form a magnesium-halide during the cleavage reaction, and
   (c) at least one transition metal compound of Groups IVA, VA or VIA of the Periodic Table,
   with the proviso (i) that the at least one particulate support material is treated with (a) the at least one organomagnesium compound $R^1MgR^2$ and then with the at least one cleavage agent or (b) the at least one cleavage agent and then with the at least one organomagnesium compound $R^1MgR^2$ or (c) a mixture, or at least a notional product of a reaction, of the at least one organomagnesium compound $R^1MgR^2$ and the at least one cleavage agent prior to being treated with the at least one transition metal compound of Groups IVA, VA or VIA of the Periodic Table, and (ii) that the at least one cleavage agent does not consist of a halogenating agent and a Lewis Base.

2. A transition metal composition as claimed in claim 1 which is the product of treating the at least one particulate support material with the at least one organomagnesium compound $R^1MgR^2$, then with the at least one cleavage agent, and then with the at least one transition metal compound of Groups IVA, VA or VIA of the Periodic Table.

3. A transition metal composition as claimed in claim 1 which is the product of treating the at least one particulate support material with (i) an organomagnesium compound which contains both (a) hydrocarbyl and (b) either hydrocarbyoxy, dihydrocarbylamino or hydrocarbylcarboxylate groups which compound is at least notionally the product of reacting the at least one cleavage agent, and then (ii) the at least one transition metal compound of Groups IVA, VA or VIA of the Periodic Table.

4. A transition metal composition as claimed in claim 3 which is the product obtained using, as the organomagnesium compound, a compound or mixture of compounds represented by the formula $R_x{}^1MgY_{2-x}$ in which Y is $-OR^3$, $-NR_2{}^3$ or $-OCOR^3$ where $R^3$ is a hydrocarbyl group and x has a value from 0.2 up to 1.8, preferably from 0.5 up to 1.5.

5. A transition metal composition as claimed in claim 1 which is the product obtained by using, as the at least one particulate support material, silica, alumina, magnesia or mixtures of two or more thereof.

6. A transition metal composition as claimed in claim 2 which is the product obtained using, as the at least one cleavage agent, an ester, water, a carboxylic acid, an alcohol, a thioalcohol, a phenol or an amine.

7. A transition metal composition as claimed in claim 6 which is the product obtained using, as the at least one cleavage agent, an aliphatic alcohol containing from 1 to 6 carbon atoms.

8. A transition metal composition as claimed in claim 1 which is the product obtained using titanium tetrachloride as the at least one transition metal compound.

9. A transition metal composition as claimed in claim 1 which is the product of treating the at least one particulate support material, after treatment with the at least one organomagnesium compound and the at least one cleavage agent, and before or after treatment with the at least one transition metal compound, with at least one silicon compound containing at least one silicon-hydrogen bond.

10. An olefin polymerisation catalyst which comprises
    (a) a transition metal composition as claimed in any one of claims 1 to 9; and
    (b) an activator which is an organometallic compound of a metal of Groups I to IV of the Periodic Table.

* * * * *